Patented Nov. 20, 1923.

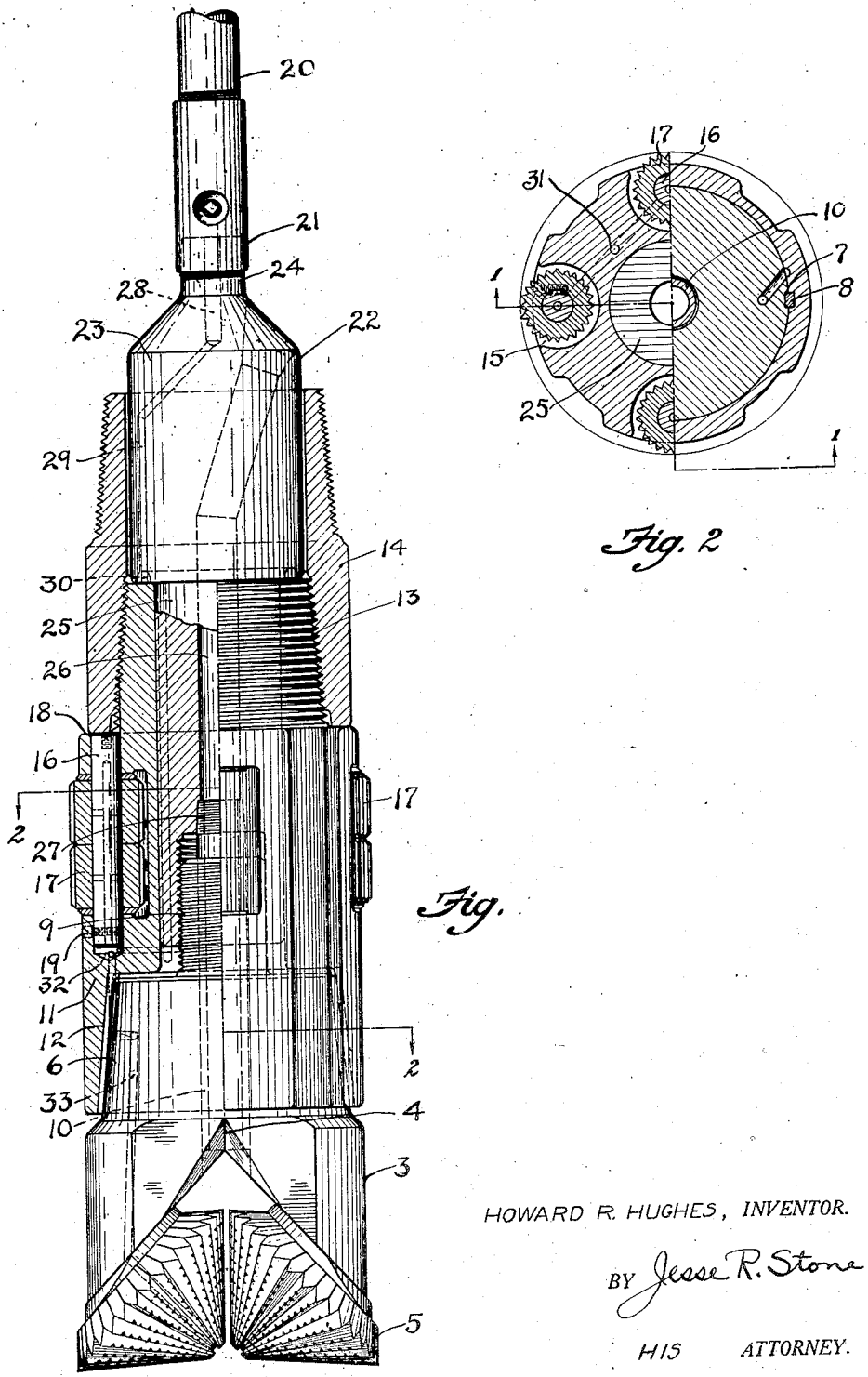

1,474,633

UNITED STATES PATENT OFFICE.

HOWARD R. HUGHES, OF HOUSTON, TEXAS.

ROTARY EARTH-BORING DRILL.

Application filed July 29, 1921. Serial No. 488,464.

*To all whom it may concern:*

Be it known that I, HOWARD R. HUGHES, a citizen of the United States, residing at Houston, Harris County, Texas, have invented a certain new and useful Improvement in Rotary Earth-Boring Drills, of which the following is a full, clear, and exact description, such as will enable others skilled in the art to which it appertains to make and use the same.

My invention relates to rotary earth boring drills for use in drilling deep wells for oil, water, gas, sulfur etc.

The object of my invention is to provide a means of securing the parts of the bit head together that will enable the operator to quickly assemble the bit.

Another object of my invention is to provide a structure of the kind described which may be made with a minimum amount of machining and cutting and which will be strong and rugged.

In the drawing herewith Fig. 1 is a side view partly in elevation and partly in central longitudinal section, of my drill, Fig. 2 is a transverse section on the plane 2—2 of Fig. 1.

My invention consists particularly in the details of construction of a tool otherwise generally well known. I have shown the invention applied to a rock bit now in common use in which there is a head 3 split longitudinally along a central plane 4 and having two cone shaped rolling cutters 5 provided with cutting teeth thereon. The upper shank 6 of the drill is reduced in diameter and tapered. It has a plurality of keyways 7 (see Fig. 2), on its tapered periphery each keyway shaped to receive key 8 by means of which the drill head is secured against rotation relative to a drill collar, reamer or other part.

The upper end of the shank 6 is formed with a threaded upwardly extending nipple 9. The said nipple 9 is formed with a longitudinally extending channel therethrough, said channel extending through the full length of the head of the bit. In the channel thus formed, I contemplate placing a removable tube or pipe 10 to conduct the flushing water through the head of the bit to the cutters.

Although the head of the bit may be attached directly to a drill collar, it is preferable in ordinary practice to provide a reamer between the head of the bit and the drill collar, and I have shown my drill as used in combination with a reamer 11. This reamer is somewhat cylindrical in shape and has a tapered socket 12 at the lower end, the sides of this socket being provided with keyways to receive the keys 8, previously described, thereby preventing rotary movement of the reamer relative to the bit. The upper end of the reamer is formed with a reduced shank 13 and threaded to form means by which it may be secured to a drill collar 14, of ordinary construction. The head of the reamer is bored out centrally to form a large channel therethrough.

To perform the reaming operation I have shown four sets of reaming cutters placed in pairs diametrically opposite each other as shown best in Fig. 2. These cutters are mounted in pockets or recesses 15 in the side of the head of the reamer and are adapted to rotate upon upright axes or pins 16. The reamers are made up of two cylindrical rolling cutters 17 having longitudinal teeth thereon to bear against the side wall of the hole and to maintain the gauge thereof. The cutting periphery of each of these cutters projects slightly beyond the face of the reamer body to maintain the hole of practically the gauge of the cutters 5 on the bit. The pins 16 upon which the cutters are mounted are inserted downwardly through the sockets 15 in which the cutters rotate by providing an opening in the shoulder 18 at the upper end of the head adjacent the rotated shank. When thus fitted within the head of the reamer, the screwing of the drill collar 14 on the shank 13 of the bit will bring the lower end of the said collar into contact with the upper ends of the pins 16, and thus hold them securely in position during the operation of the drill. To prevent the rotation of the pins relative to the reamer, set screws 19 may be inserted into the head of the reamer and into grooves formed in the sides of the pins 18 in the manner shown particularly in Fig. 2.

To provide means for lubricating the cutters of the drill and of the reamer, I contemplate using a lubricating barrel 20 connected by means of a coupling 21 to a specially formed collar 22. The collar 22 comprises an upper head 23 of such diameter as to fit loosely within the drill collar 14. The upper end thereof is tapered and provided with a threaded upper extension 24 by means of which it is connected to the coupling 21. At the point where it contacts with the upper end of the reamer, the head 23 is reduced abruptly in diameter to form a forward extension 25 which fits closely within the interior channel of the reamer and is threaded interiorly at its lower end to receive the nipple 9 on the shank of the bit. This extension 25 is also provided with a central water channel 26 therein, this channel being formed with a threaded socket 27 to receive the upper end of the removable water pipe 10, previously described. The channel 26 in the collar 22 is inclined outwardly at its upper end to provide an entrance thereto upon the tapered portion of the head 23.

At the upper end of the head 23 of the collar is a central oil duct 28 connected with the lubricator. This duct is inclined outwardly and connected with a duct 29 leading to an annular channel 30 formed in the lower shoulder of the head 23. From the upper end of the reamer I provide a plurality of downwardly extending oil ducts 31 connecting with the annular channel 30 so as to conduct the oil downwardly to a point adjacent the lower end of each of the pins 16 from which a laterally branching channel conducts the lubricant to a small lubricant chamber 32 at the lower end of the pins. Each of the pins 16 is provided with a central bore having laterally branching ducts thereon adapted to conduct the lubricant to the bearings of the cutters in the usual manner.

The cutters of the bit are lubricated by means of a channel connecting the chamber 32 at the lower ends of the pins 16 to ducts 33 formed in the head of the drill, these ducts leading downwardly and through the pins upon which the bit cutters 5 are mounted, to the bearings thereof.

This construction thus described, whereby the drill is connected non-rotatably to the reamer by means of the keys 8 and whereby the reamer is held against the head of the drill by means of the collar 22 of the lubricator, is a very advantageous type of construction in that there are no threads upon the shank of the bit to mutilate or become clogged or which have to be tightened firmly in position when the drill is assembled. All that is necessary in this construction is to set the reamer firmly down over the head of the bit and then insert downwardly through the central channel of the reamer the lower extension 25 of the lubricator, rotating the lubricator sufficiently to force the reamer firmly into position, the drill collar is then secured to the upper shank of the reamer and the drill stem connected with the drill collar in the usual manner.

This type of construction also has certain advantages in that the cutter pins 16 upon which the reaming cutters are mounted are held against accidental removal during the operation of the drill, and furthermore, the channels for the lubricant may be most conveniently formed in the reamer and the drill. The main advantages lie particularly in the ease with which the parts may be assembled and the strong and rugged construction of the parts and the arrangement whereby there will be no danger of the loss of cutters or pins during the operation of the drill.

Having thus described my invention, the further objects and advantages of which will be obvious to one skilled in the art, what I claim as new and desire to protect by Letters Patent is:

1. In a rotary earth boring drill, a drill head having cutters thereon, an upwardly tapering shank on said head, a reamer keyed to said shank and having a smoothly tapered recess to receive it, a lubricator secured to said head and extending centrally through said reamer, and a drill collar secured to said reamer and surrounding said lubricator.

2. In a rotary earth boring drill, a drill head, a smooth tapered shank thereon, a threaded nipple on the upper end of said shank, a reamer having a tubular head and adapted to be keyed to said shank, and a lubricator collar projecting downwardly through said reamer for attachment to said nipple and adapted to clamp said reamer on said drill shank.

3. In a rotary earth boring drill, a drill head having a smooth upwardly tapering shank thereon, a threaded nipple on said shank, a reamer keyed to said shank having a tubular opening longitudinally thereof, a lubricator collar resting on the upper end of said reamer and having a reduced extension fitting said tubular opening and means to secure said extension to said nipple.

4. In a rotary earth boring drill, a drill head having a tapered upper shank, a tubular member keyed to said shank, means to clamp said tubular member to said head comprising a lubricator collar fitting against the upper end of said tubular member and extending downwardly therethrough, and means to secure said collar to said drill head, said collar and head having a central channel to allow passage of flushing water therethrough.

5. In a rotary earth boring drill, a drill head, a reamer keyed thereto, cutters on said reamer mounted on pins fitting in openings in the body of said reamer, a drill collar secured to said reamer and bearing on said pins, and a lubricator collar within said drill collar and secured to said drill head so as to retain said reamer and drill head together.

6. In a rotary earth boring drill, a drill head having cutters thereon, a smooth upwardly tapering shank on said head, a reamer having a tapered recess to receive said shank, said reamer and shank being keyed together, a lubricator fitting against the upper end of said reamer and a central extension thereon projecting through said reamer for attachment to said drill, said extension and head having a central wa: channel therethrough for the purpose described.

In testimony whereof, I hereunto affix my signature.

HOWARD R. HUGHES.